United States Patent
Wüller

[11] Patent Number: 5,374,144
[45] Date of Patent: Dec. 20, 1994

[54] PROCESS FOR REMOVING CHIPS FROM WORKPIECES

[75] Inventor: Karl-Heinz Wüller, Simmerath, Germany

[73] Assignee: Dürr GmbH, Stuttgart, Germany

[21] Appl. No.: 134,070

[22] Filed: Oct. 12, 1993

[30] Foreign Application Priority Data

Oct. 23, 1992 [DE] Germany .................. 4235749
Nov. 5, 1992 [DE] Germany .................. 4237336

[51] Int. Cl.$^5$ ............................................. B23B 47/34
[52] U.S. Cl. ............................... 409/131; 82/900; 408/1 R; 409/137
[58] Field of Search ............... 409/131, 132, 137, 140; 82/900; 29/33 A; 408/1 R, 60, 61, 67, 68

[56] References Cited

U.S. PATENT DOCUMENTS 3,215,350 11/1965 Hetrick .................. 239/288
4,398,961 8/1983 Mason .................... 134/19
4,413,814 11/1983 Lobastov ................ 29/33 A

FOREIGN PATENT DOCUMENTS

| 254348 | 2/1988 | German Dem. Rep. . |
| 280271 | 7/1990 | German Dem. Rep. . |
| 3000815 | 7/1981 | Germany . |
| 3521542 | 12/1986 | Germany . |
| 1166898 | 7/1985 | U.S.S.R. .................. 408/1 R |

Primary Examiner—Z. R. Bilinsky
Attorney, Agent, or Firm—Flynn, Thiel, Boutell & Tanis

[57] ABSTRACT

A process for removing chips jammed in a cavity of a workpiece produced during machining work by means of a jet of compressed air, wherein for quick, simple and complete removal of these chips a hot jet of compressed air is used at such a temperature and directed onto the chips for such a time that their rigidity is diminished until the chips can be removed from the cavity as a result of the jet of compressed air.

9 Claims, 1 Drawing Sheet

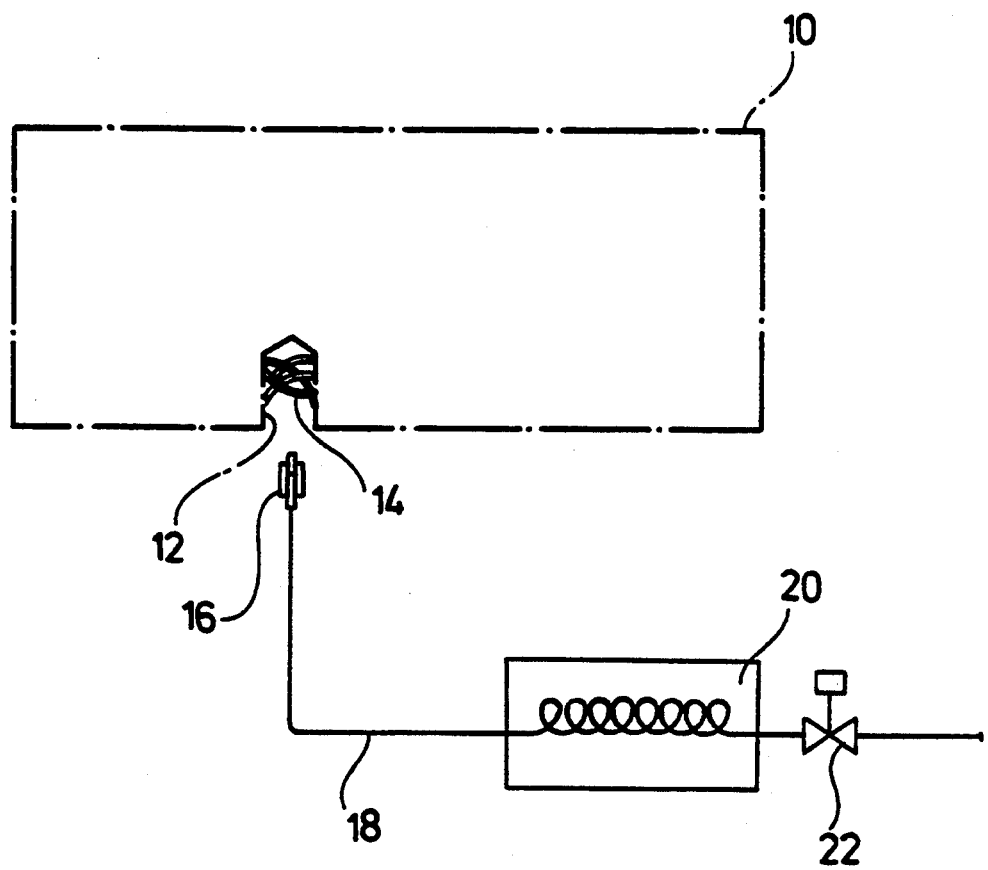

PROCESS FOR REMOVING CHIPS FROM WORKPIECES

During the machining of workpieces, particularly during the production of blind bores by means of a drill, but also when turning the inside diameter, i.e. when machining the walls of a narrow cavity with a rotary tool on a lathe, when cutting internal threads and the like, the problem of removing chips jammed in the cavity often arises. This problem has proven, in practice, to be particularly difficult in the case of those materials which form long and relatively firm or rigid chips, such as, for example, in the case of brass and many aluminum alloys. This difficulty can, however, also result during the machining of plastic workpieces.

Such chips jammed tightly in a cavity can often not be removed at all in the conventional manner, namely by blowing out the cavity with a compressed air nozzle, or there is at least the risk that not all the chips can be expelled from the cavity. This also applies to chips which cannot be removed during the washing of workpieces in cleaning plants. Other mechanical cleaning processes, such as, for example, pushing out the chips by means of a punch, can often not be used, and certainly not in the case of, for example, blind bores, or they are too time-consuming and therefore too expensive.

The object underlying the invention was therefore to provide a process, with which chips and other, similar impurities, in particular metallic chips, jammed in workpiece cavities can be removed quickly and simply therefrom. Proceeding on the basis of a process for removing chips and the like jammed in a cavity of a workpiece, which is produced, in particular, by machining work or also by casting techniques, by means of a jet of compressed air, this object may be accomplished in accordance with the invention in that a hot jet of compressed air is used at such a temperature and directed onto the chips for such a time that their rigidity is diminished until the chips are removable from the workpiece cavity as a result of the jet of compressed air.

When discovering the inventive process, the inventor proceeded on the basis of the following consideration: During the machining of metallic workpieces, the chips resulting therefrom are generally "hardened" due to the fact that the chips which result from machining and are mostly very hot are quenched, i.e. rapidly cooled, by the cooling or cutting liquids used during machining and/or by the ambient air. This causes considerable inherent tension in the chips which can be reduced by a hot jet of air so that the chips lose their rigidity or stiffness. When the jet of air is adequately hot, the chips can be heated to just below the melting point of their material, which causes them to become soft. In any case, the chips originally jammed in the workpiece cavity can then be blown out of the workpiece cavity by the jet of compressed air, as is the case in the conventional cleaning method for chips lying loosely in a workpiece cavity.

For example, with a workpiece consisting of an aluminum alloy it was possible to remove chips completely in only approximately 5 seconds from a threaded bore M8×22 constructed as a blind bore, using a jet of compressed air of 550° C. and 6 bars from a nozzle opening spaced from the chips by approximately 5 mm, without the material of the bore walls thereby being heated to any appreciable extent.

The inventive process has, in addition, the advantage workpiece is dried by the hot jet of compressed air. This is of significance because cooling or cutting fluids are customarily used during machining operations. This applies in the same way to cleaning fluids from washing plants.

During the machining of workpieces, a so-called fringed burr, i.e. a burr of fine, fringe-like elements, often results at the border of machining edges. This has to be removed but, so far, this has been possible only by way of complicated measures. In this case, as well, the problem can be remedied by the inventive process in that a hot jet of compressed air is used at such a temperature and directed onto the burr for such a time until this melts at least partially. A structure then results from the burr which is at least no longer troublesome and which no longer entails the risk, in contrast to a fringed burr, of the components of the burr later, i.e. during operation of an engine, becoming loose and leading to stoppages.

Additional features, advantages and details of the inventive process result from the attached claims and/or from the following description of one embodiment, which will be explained on the basis of the attached, schematic drawing.

The drawing shows a workpiece 10 consisting of an aluminum alloy and in which a blind bore 12 has been produced. Chips 14 formed during machining are jammed tightly in the bore following this machining.

An inventive apparatus for performing the inventive process consists of a compressed air nozzle 16, which can be electrically heated and is connected to a compressed air line 18 which includes an air heater 20 and a valve 22. The compressed air line 18 is fed from a compressed air source which is not illustrated and which supplies compressed air at a pressure of 6 bars. In accordance with the invention, the air heater 20 and/or the heating for the compressed air nozzle 16 is designed such that the latter supplies a jet of compressed air having a temperature of approximately 600° C. If the compressed air nozzle 16 is moved towards the chips 14 to a distance of approximately 5 mm, all the chips 14 can be blown out of the blind bore 12 within a few seconds.

It is apparent from the above that the inventive process is suitable, in particular, for metallic workpieces and, especially, for those metallic workpieces which consist of a metallic material which tends to form relatively long and tough chips during machining work.

As a result of the inventive process, metallic chips can also be annealed or even melted. Moreover, it is possible, when using a suitable gas jet, to burn chips, e.g. in the case of plastic chips, without this damaging the actual workpiece since the mass of the chips is very small and, therefore, the operative time of the hot gas jet is very short.

The present disclosure relates to the subject matter disclosed in German applications No. P 42 35 749.7 of Oct. 23, 1992 and No. P 42 37 336.0 of Nov. 5, 1992, the entire specifications of which are incorporated herein by reference.

What is claimed is:

1. A process for removing chips in a cavity of a workpiece and resulting from machining the workpiece, said process comprising the steps of providing a stream of pressurized air, heating said stream of pressurized air by heating means to elevated temperature, conveying the stream of heated pressurized air to a nozzle to produce a jet of hot pressurized air leaving said nozzle, and directing said jet for a time period onto the chips in said cavity, said elevated temperature and said time period being selected such that by heating said chips by said jet of hot pressurized air the rigidity of said chips is diminished sufficiently for having the chips blown out of said cavity by said jet.

2. The process of claim 1, wherein said chips have rigidity resulting from machining said workpiece, and wherein said high temperature and said time period are selected such that said rigidity is at least reduced.

3. Process as defined in claim 1, wherein said elevated temperature is at least equal to the melting temperature of the chip material.

4. Process as defined in claim 1, wherein chips comprising an aluminum alloy are removed from said cavity, said elevated temperature being about 500° C. to about 600° C.

5. Process as defined in claim 1, wherein said stream of pressurized air has a pressure of at least about 5 bars.

6. Process as defined in claim 5, wherein said stream of pressurized air has a pressure of at least about 6 bars.

7. Process as defined in claim 1, wherein said nozzle is disposed at a distance of less than about 10 mm from the chips.

8. Process as defined in claim 7, wherein said nozzle is disposed at a distance of about 5 mm.

9. A process for treating a workpiece having an edge provided with burrs resulting from machining said workpiece, wherein for removing or decreasing said burrs the process comprises the steps of providing a stream of pressurized air, heating said stream of pressurized air by heating means to elevated temperature, conveying the stream of heated pressurized air to a nozzle to produce a jet of hot pressurized air leaving said nozzle, and directing said jet for a time period onto said burrs, said elevated temperature and said time period being selected such that by heating said burrs by said jet of hot pressurized air the burrs melt at least partially.

* * * * *